(12) United States Patent
Willsch et al.

(10) Patent No.: US 11,732,763 B2
(45) Date of Patent: Aug. 22, 2023

(54) RAMP ACTUATOR AND ANGULAR-CONTACT BALL BEARING UNIT HAVING A COLD-FORMED OUTER RING AND AN EMBOSSED RAMP CONTOUR, AND METHOD FOR PRODUCING A RAMP DISC

(71) Applicant: Schaeffler Technologies AG & Co. KG, Herzogenaurach (DE)

(72) Inventors: Christian Willsch, Mühlhausen (DE); Andreas Neudecker, Lonnerstadt (DE); Andreas Heinz, Nuremberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/260,860

(22) PCT Filed: May 29, 2019

(86) PCT No.: PCT/DE2019/100472
§ 371 (c)(1),
(2) Date: Jan. 15, 2021

(87) PCT Pub. No.: WO2020/069689
PCT Pub. Date: Apr. 9, 2020

(65) Prior Publication Data
US 2022/0136567 A1 May 5, 2022

(30) Foreign Application Priority Data
Oct. 4, 2018 (DE) ...................... 10 2018 124 444.4

(51) Int. Cl.
*F16D 23/12* (2006.01)
*F16C 19/16* (2006.01)

(52) U.S. Cl.
CPC .............. *F16D 23/12* (2013.01); *F16C 19/16* (2013.01); *F16C 2326/01* (2013.01);
(Continued)

(58) Field of Classification Search
CPC ........................... F16D 2023/123; F16C 19/16
See application file for complete search history.

(56) References Cited

U.S. PATENT DOCUMENTS 3,127,969 A * 4/1964 Hansen .................... F16D 23/12
192/89.1
4,878,567 A * 11/1989 Buckley ................. F16D 67/02
192/111.1

(Continued)

FOREIGN PATENT DOCUMENTS

CN 207906317 U 9/2018
DE 102005051500 B3 7/2007
(Continued)

*Primary Examiner* — Richard W Ridley
*Assistant Examiner* — Aimee Tran Nguyen (57) ABSTRACT

A ramp actuator has a pivotable ramp disc, which on a first end face has at least one ramp, which is prepared for the rolling of a rolling body and, spaced apart therefrom, has a raceway for bearing rolling bodies of a rolling bearing prepared to receive radial and axial forces. A bearing ring can be fixed on a shaft, wherein the ratio of the axial width of the ramp disc relative to the support height thereof is between 2.9 and 4.1 and the ratio between the ramp radius of the ramp of the ramp disc relative to the support height of the ramp disc is between 0.7 and 1.3. A method for producing a ramp disc for such a ramp actuator includes drawing, upset forging and embossing, preferably carried out in that order.

6 Claims, 5 Drawing Sheets

(52) U.S. Cl.
CPC .......... *F16D 2023/123* (2013.01); *F16D 2200/0004* (2013.01); *F16D 2250/0023* (2013.01)

(56) References Cited

U.S. PATENT DOCUMENTS

| | | |
|---|---|---|
| 5,964,330 A | 10/1999 | Organek et al. |
| 2009/0163313 A1 | 6/2009 | Gassmann et al. |
| 2009/0211855 A1 | 8/2009 | Dennis et al. |
| 2009/0260945 A1* | 10/2009 | Martini ............ F16H 25/186 192/93 A |
| 2018/0080508 A1 | 3/2018 | Nahrwold et al. |

FOREIGN PATENT DOCUMENTS

| | | | |
|---|---|---|---|
| DE | 102006025059 A1 | 12/2007 | |
| DE | 102008011914 A1 | 9/2009 | |
| DE | 102011083047 A1 * | 3/2013 | ............ F16C 19/10 |
| DE | 102014215257 A1 | 2/2015 | |
| DE | 202014102671 U1 | 10/2015 | |
| WO | 2015162477 A1 | 10/2015 | |
| WO | 2018041323 A1 | 3/2018 | |
| WO | 2018099642 A1 | 6/2018 | |

* cited by examiner

RAMP ACTUATOR AND ANGULAR-CONTACT BALL BEARING UNIT HAVING A COLD-FORMED OUTER RING AND AN EMBOSSED RAMP CONTOUR, AND METHOD FOR PRODUCING A RAMP DISC

CROSS-REFERENCE TO RELATED APPLICATIONS

This application is the U.S. National Phase of PCT Appln. No. PCT/DE2019/100472 filed May 29, 2019, which claims priority to DE 10 2018 124 444.4 filed Oct. 4, 2018, the entire disclosures of which are incorporated by reference herein.

TECHNICAL FIELD

The disclosure relates to a ramp actuator for a motor vehicle transmission or a motor vehicle clutch, having a pivotable ramp disc/a pivotable ramp ring, which can also be referred to as a pivot actuator disc and has an optional, for example, external tooth element, the ramp disc/ramp ring having at least one ramp on a first end face which is prepared for the rolling of a rolling body such as a ball and has, at a distance therefrom, a raceway for bearing rolling bodies of a rolling bearing prepared to receive radial and axial forces, as well as having a bearing ring which can be fixed on a shaft, is designed, for example, as a bearing inner ring and which in particular also has a raceway for the bearing rolling bodies.

BACKGROUND

Clutch arrangements for motor vehicles are already known from the prior art. For example, WO 2018/099642 A1 discloses a clutch arrangement for a motor vehicle comprising a friction clutch and an actuator unit for actuating the friction clutch, wherein the actuator unit has a ramp mechanism with a fixed first ramp disc and a second ramp disc that is movable relative to the first ramp disc. There is a coolant reservoir with coolant for lubricating the friction clutch, the coolant reservoir being arranged geodetically above the central axis with respect to a central axis of the friction clutch. There is also a metering unit for controlling the coolant flow from the coolant reservoir into the friction clutch, the metering unit being partially formed on or in the first ramp disc and geodetically arranged below the central axis with respect to the central axis of the friction clutch.

The generic prior art is also known from DE 10 2005 051 500 B3. It discloses an arrangement for measuring force on a friction clutch, in particular in the drive train of a motor vehicle. The arrangement comprises an outer plate carrier on which the outer plates are held for conjoint rotation and so as to be axially displaceable along a longitudinal axis "A". There is an inner plate carrier on which the inner plates are held for conjoint rotation and so as to be axially displaceable along the longitudinal axis "A". The outer plates and the inner plates are arranged axially in an alternating manner and together form a plate stack. Furthermore, the outer plate carrier is to be mounted so as to be rotatable about the longitudinal axis "A" to a limited extent relative to a housing and has at least one cam for rotational support. There are also means for force measurement, which are to be arranged in the housing in such a way that when the friction clutch is actuated, the at least one cam acts on said means in an effective direction extending at a distance transverse to the longitudinal axis. That earlier disclosure also relates to a transmission arrangement having such an arrangement for force measurement. Usually, the rolling bodies rolling on the ramps of the ramp disc act on a stationary, i.e. non-rotating, actuator disc which carries out an actuating movement. The disclosure also relates to such a combination in which a corresponding stationary actuator disc is integrated.

In some applications, previous ramp actuators have encountered a problem with heat treatment. In particular with sintered ramp discs/actuator discs, problems arise due to increased changes in wall thickness.

Usually, a two-part variant is also used, in which a single-row angular contact ball bearing is installed with the sintered actuator disc. Unfortunately, there is then an additional tolerance chain, which means that another tolerance situation must be considered. In the first step, the combination of an angular contact ball bearing with the actuator disc as a one-piece component has proven to be beneficial. Unfortunately, this currently entails a bulky design, which among other things is undesirable for the reasons given above.

SUMMARY

However, the disadvantages from the prior art are now intended to be avoided or at least mitigated. In particular, an uneven application of hardness into the individual actuator discs due to large changes in wall thickness are to be prevented. Additional tolerances between the actuator disc and the angular contact ball bearing are also to be excluded. In addition, relative movement between the actuator disc and the angular contact ball bearing and increased wear are to be suppressed. The previously high space requirement due to a joint are to be avoided. It should be possible to eliminate a pre-assembly of the angular contact ball bearing in the actuator disc. Furthermore, a high loss of material is intended to be avoided with the usual machining combination of actuator disc and angular contact ball bearing outer ring. A machining combination of the actuator disc and the angular contact ball bearing outer ring has previously had to be thoroughly hardened, which entails long hardening times, which are also to be avoided. Basically, the long durations and high costs involved in machining production of the ramp contour are to be avoided. Material fibers are no longer to be cut to increase strength.

In summary, as a result, adjustment units, comprising rolling bearings and a ramp actuator with a ramp mechanism, including a pivot actuator disc/ramp disc and a stationary actuator disc, are produced so as to no longer have too much material/be bulky and no longer be machined. Nevertheless, high loads should be absorbed.

This is achieved in a device of the type in question in that, on the one hand, the ratio of the axial width of the ramp disc relative to the support height thereof is between 2.9 and 4.1, preferably 3.0, 3.1, 3.2, 3.3, 3.4, 3.5, 3.6, 3.7, 3.8, 3.9, or 4.0, and, on the other hand, the ratio between the ramp radius of the ramp of the ramp disc relative to the support height of the ramp disc is between 0.7 and 1.3, preferably 0.8, 0.9, 1.0, 1.1, or 1.2.

In other words, sheet metal material is used to be able to produce an adjustment unit. A grain is not interrupted in the solution presented and extends from the end face of the ramp disc, having the ramp contour, in the direction of an opposite end face, with the outer contour of the component being followed. The grain approaches a radial inner edge of the end face having the ramp contour in a targeted manner.

A bulky ramp disc, as is known from DE 10 2005 051 500 B3, is avoided. Nevertheless, three or five balls with/without an axial ball cage can be used. The stationary actuator disc is also mounted. The pivoting actuator disc, i.e. the pivotable ramp disc, is mounted in such a way that it actuates the plates of a plate stack of a multi-plate clutch, namely using the stationary actuator disc. Due to a relative rotational movement of the toothed actuator disc/ramp disc with respect to the stationary actuator disc, the balls are rolled along a ramp geometry, which results in an axial displacement from the ramp gradient. This axial displacement actuates a plate stack, which can be used to map switching states in the transmission.

The ramp disc thus has a double function, namely to have ramps for balls to run off and to provide a raceway for contacting the rolling bodies of an angular contact ball bearing. As a result, an adjustment unit for a release system for multi-plate clutches can be implemented, for example with (differential) drives, with a stationary clutch disc on one side and an actuating element on the other. It has proven useful if the ramp contour is embossed.

It is advantageous if, on the one hand, the ratio between the diameter of the ball-shaped bearing rolling body relative to the shoulder height of the bearing ring is ≥3:2 but <10, 7.5 or 5 and, on the other hand, the ratio of the wall thickness of the bearing ring at the apex of the bearing rolling body relative to the shoulder height of the bearing ring is between 0.2 and 0.6, preferably 0.3, 0.4 or 0.5±0.05.

An advantageous exemplary embodiment is also characterized in that the ramp ring is designed as a sheet metal part produced without cutting. Chipping operations can then be dispensed with, which means that the grain remains uninterrupted and the loads during operation can be higher.

It is useful if the rolling bearing is designed and installed as an angular contact ball bearing or an inclined ball bearing. In this way, a durable sub-assembly can be created with inexpensive standard components.

If there are three segment-like delimited ramps with a concave contour over the circumference of the end face of the ramp disc, the application of force can be optimized and tilting can be prevented. The result is good functionality.

An advantageous embodiment is also characterized in that the end face of the ramp disc is provided by a flange which has at least one radially protruding projection and/or end-face grooves which are evenly distributed, as viewed over the circumference, and identical. An electromotive pivoting by means of an electric motor can then be brought about efficiently due to a form fit. Lubricants can also be skillfully supplied.

A method is disclosed for producing a ramp disc for a ramp actuator, the ramp disc preferably having ratios of the axial width of the ramp disc relative to the support height thereof of between 2.9 and 4.1 and a ratio between the ramp radius of the ramp of the ramp disc relative to the support height of the ramp disc of be-tween 0.7 and 1.3, and the steps of drawing, upset forging and embossing are carried out, preferably in this order.

A further development of the method is disclosed for producing a ramp disc for a ramp actuator, in particular having the steps of drawing, upset forging and embossing, wherein other steps or additional steps can be present instead of these steps, and the aforementioned ratios exist or are modified, with the smallest radial and/or axial wall thickness of the ramp disc being greater than the thickness of the starting material thereof, such as a round blank.

It is advantageous if the ramp disc is trimmed and/or perforated between the drawing and the upset forging.

It is also advantageous if the distance between the ramp surface and the raceway on the inside of the ramp disc for the balls of the angular contact ball bearing is greater at the thinnest point thereof than the thickness of the starting material for the ramp disc.

A combination of the actuator disc with the ramp contour and the (bearing) outer ring of a single-row angular contact ball bearing is now disclosed while avoiding joints. This one-piece variant therefore enables easier handling and easier assembly. A compact design with a reduction in installation space and weight is achieved. The (bearing) outer ring is shaped without cutting, in particular using cold forming/deep drawing of a shoulder for the ball bearing raceway. The bearing raceway can be pre-embossed and then possibly reworked by machining, for example using grinding and/or honing steps. 16MnCr5 has proven to be the preferred material. The required surface hardness can be achieved by means of case hardening. Case hardening is also suitable for cold forming. The result is higher strength due to the forming process, due to the avoidance of cutting through the material fibers.

The shape is predefined from a round blank by means of deep drawing. The ramp geometry is produced by embossing and relates to the required accuracy and surface quality. The bearing raceway is pre-embossed and then machined, if desired. The ball ring and the inner ring are as standard components as possible. It is desirable to prevent rotation by means of a lever or by means of radially arranged grooves. An oil supply through radially arranged grooves is also desirable. In other words, an adjustment unit is now possible that is no longer bulky and heavy and does not have too much material. Machining processes are not used for reasons of cost. The adjustment unit is composed of sheet metal components that can cope with the high loads in use.

BRIEF DESCRIPTION OF THE DRAWINGS

The ramp actuator and method are further explained below with the aid of a drawing. Various embodiments are shown in the process. In the figures.

DETAILED DESCRIPTION

The figures are only schematic in nature and serve only to understand the ramp actuator and method. The same elements are provided with the same reference signs.

Figure 1:
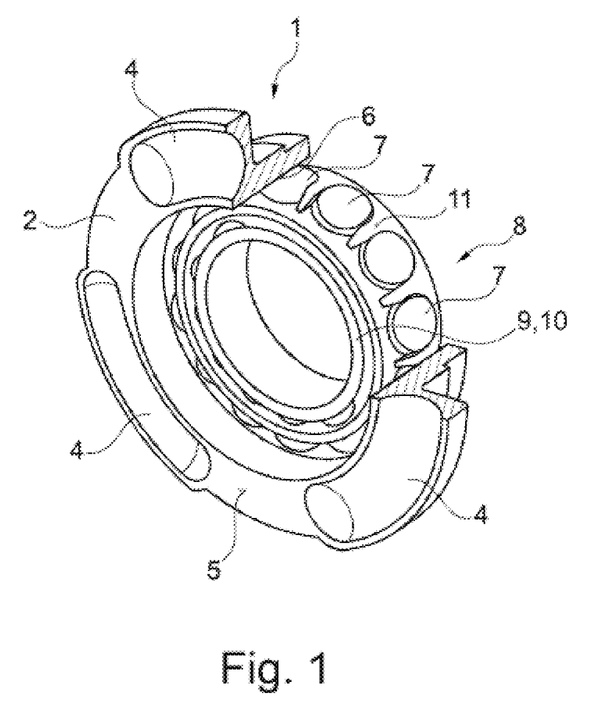
FIG. 1 shows a perspective view of a first embodiment of a ramp actuator in a partially sectioned reproduction.
Figure 10:
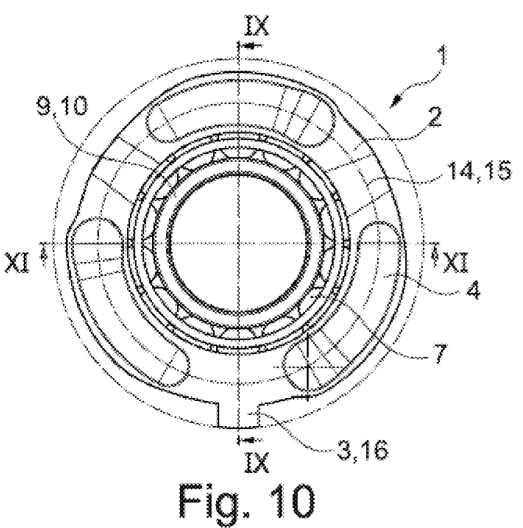
Figure 11:
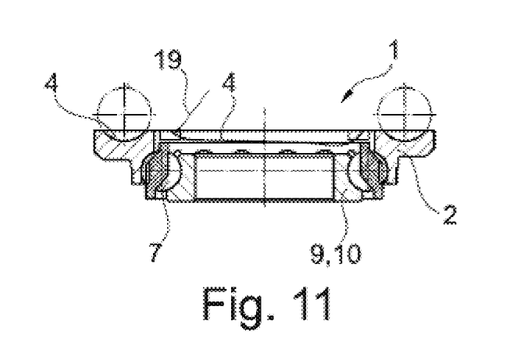

FIG. 1 shows a first exemplary embodiment of a ramp actuator 1. The ramp actuator 1 has a pivotable ramp disc 2. The ramp side 2 can also be referred to as a pivotable ramp ring or pivot actuator disc. In anticipation of FIG. 10, reference is made to a toothed segment 3 designed as a toothing or projection for coupling an electric motor.

Returning to FIG. 1, the presence of a ramp 4 on a first end face 5 or a first end face should be noted. To be precise, there are three segment-like ramps 4 which have a concave surface for receiving one or more balls, for example two, three, four or five balls. These balls are not shown.

At a distance therefrom there is a raceway 6, on which bearing rolling bodies 7 have a rolling bearing 8 which is prepared to receive radial and axial forces. This rolling bearing 8 also has a bearing ring 9, namely a bearing inner ring 10, which is pre-pared for mounting/fixing on a shaft. Said shaft is not shown. The ramp disc 2 thus represents the bearing outer ring of the rolling bearing 8. A cage 11 can be provided to hold the bearing rolling bodies 7 in position.

Figure 2:
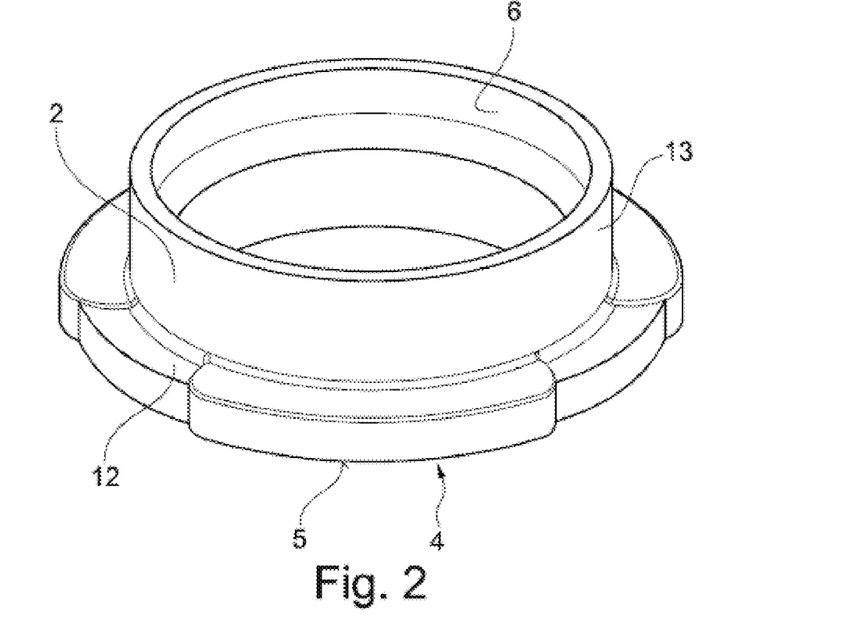
FIG. 2 shows a perspective view of only the pivotable ramp disc of the embodiment from FIG. 1.
Figure 3:
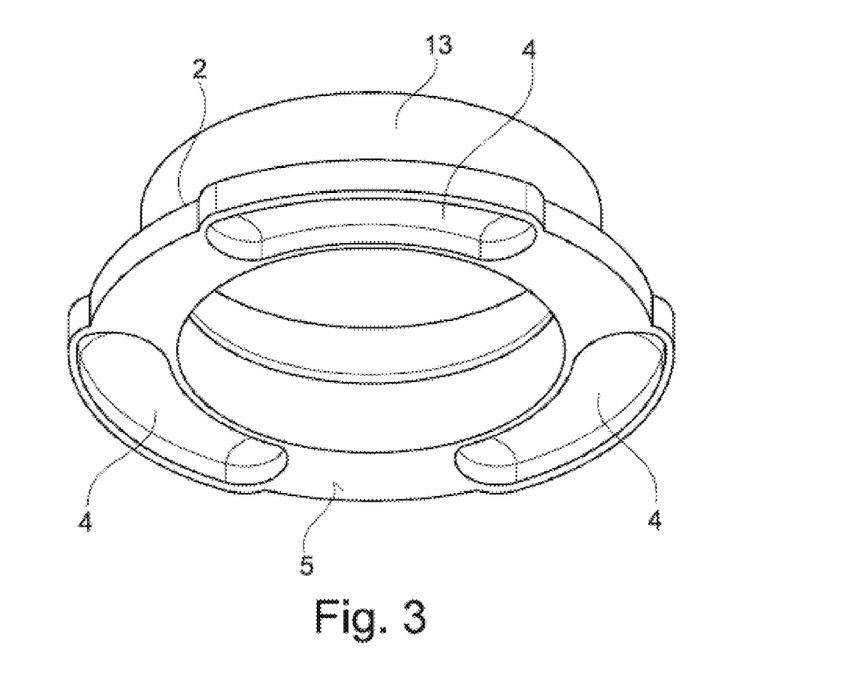
FIG. 3 shows a further perspective view of the ramp disc from FIG. 2.

As can be clearly seen in FIGS. 2 and 3, the ramp disc 2 thus has a flange/flange region 12 and a sleeve/sleeve region 13. The flange 12 provides the first end face 5 with the ramps 4, whereas the sleeve 13 provides the raceway 6 for the bearing rolling bodies 7 of the rolling bearing 8.

Figure 4:
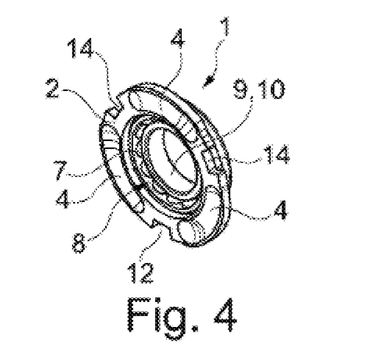
FIG. 4 shows a further perspective view of another ramp actuator.
Figure 8:
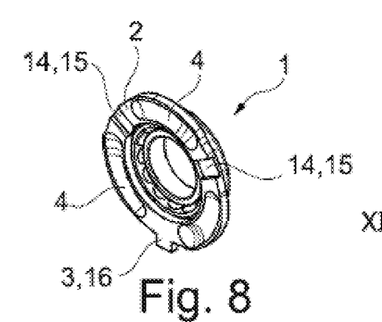
FIGS. 8 to 11 show a further embodiment of a ramp actuator according to the type of representation in FIGS. 4 to 7.

In FIG. 4 in particular, the presence of evenly distributed recesses 14 projecting in the radial direction can be seen on the outside of the flange 12 of the ramp disc 2. Notwithstanding this, there are recesses 14 of fundamentally different design in the embodiment of the ramp disc 2 according to the embodiment of FIG. 8, these recesses being designed as oil guide grooves 15 and in the manner of channels. In this embodiment, there is a radially protruding projection 16, which ultimately provides the toothed segment 3.

Figure 5:
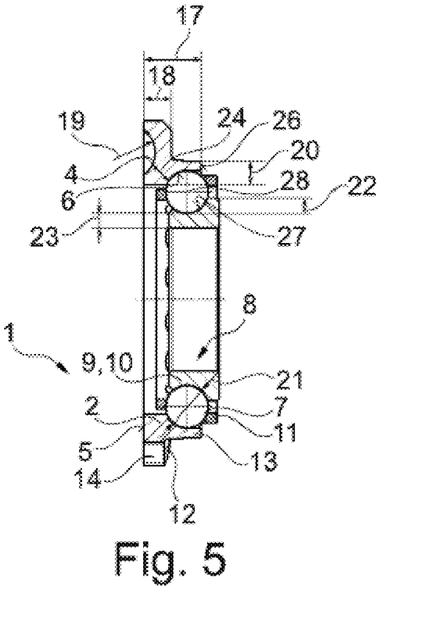
FIG. 5 shows a longitudinal section through a single-row angular contact ball bearing and a ramp disc used, as is also shown in FIG. 4, for that special exemplary embodiment of a ramp actuator.
Figure 6:
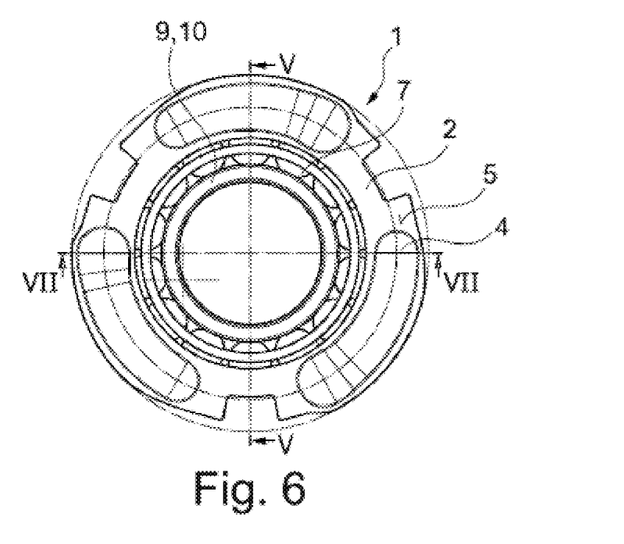
FIG. 6 shows a front view of the end face of the ramp disc with the three ramps thereof evenly distributed there and a rolling bearing designed as a single-row angular contact ball bearing located behind the ramp disc.
Figure 7:
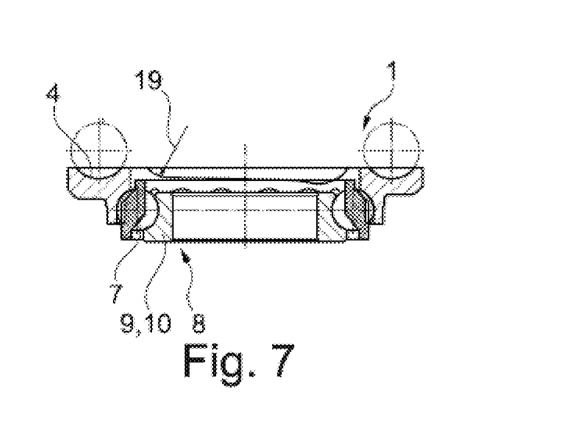
FIG. 7 shows a longitudinal section through the ramp actuator and of FIGS. 4 to 6.

Coming back to the embodiment of FIG. 4, attention is also drawn to FIGS. 5 to 7. The axial width of the ramp disc 2 is provided with the reference sign 17. The support height is provided with the reference sign 18. The ramp radius is identified with the reference sign 19. The shoulder height of the ramp disc is provided with the reference sign 20. The diameter of the spherical bearing roller body 7 is provided with the reference sign 21. The shoulder height of the bearing ring is provided with the reference sign 22. The wall thickness of the bearing ring at the apex of the bearing rolling body 7 is provided with the reference sign 23. The wall thickness of the ramp disc at the apex of the bearing rolling body is provided with the reference sign 24. The wall thickness 24 is determined by the smallest distance between the concave surface of the raceway on the ramp 4 for the corresponding ball and the raceway on the radial inside of the ramp disc 2 for the bearing rolling bodies 7.

The rolling bearing 8 is a single-row angular contact ball bearing inclined at 35°±4°. In principle, however, pressure angles that are larger or smaller than 35° are also conceivable.

The exemplary embodiment of FIGS. 8 to 11 is highly similar to that of FIGS. 4 to 7 and differs in particular in the design of the oil guide grooves 15 or the recesses 14 and the projection 16.

Support heights, axial widths and shoulder heights are conventional and defined as indicated above. It should be noted that the support height 18 of the ramp disc 2 is measured between a plane through the end face 5 and a plane on the rear side 25, whereas the axial width 17 of the ramp disc 2 results between that plane through the first end face 5 and a plane through the opposite end face 26. See in particular FIG. 9. The wall thickness 24 of the ramp disc 2 at the apex of the bearing rolling body 7 is oriented in such a way that it is perpendicular to the concave surface in the region of the ramp radius 19 of the ramp disc 2.

Figure 9:
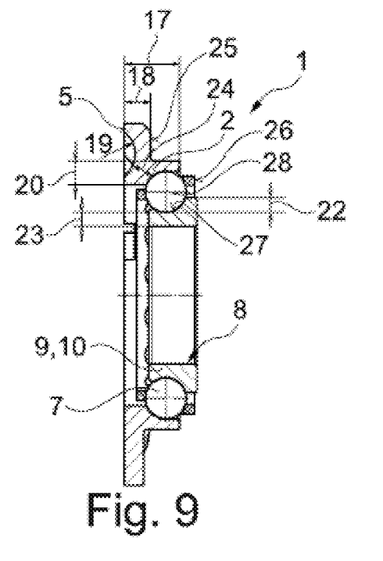

The shoulder height 22 of the bearing ring 9 is caused by the distance between a plane on the radial outside of the bearing ring 9 and a likewise concentric reference plane through the apex of the bearing rolling body 7 in the bearing ring raceway 27. The contact line is referenced with reference sign 28. It is inclined to both a radially and an axially oriented axis. It has an inclination to the radially oriented axis of 35°±4°.

Figure 12:
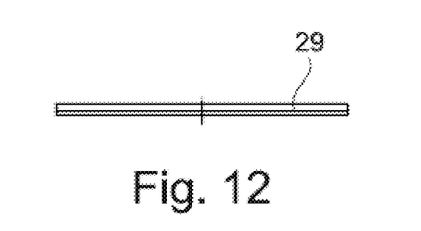
FIGS. 12 to 14 show the process sequence for producing the ramp disc.
Figure 13:
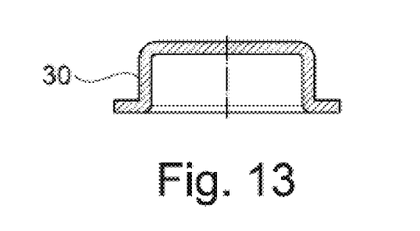
Figure 14:
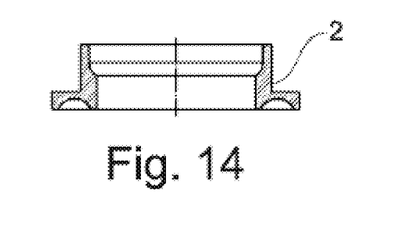

The method of production can be derived from the sequence of FIGS. 12, 13 and 14, wherein a cup 30 is created from a round blank 29 by means of a plurality of forming steps, in particular drawing steps, which is then formed into the ramp disc 2 by means of upset forging and embossing. It is important that the raceway for the bearing rolling bodies 7 can be introduced by means of an embossing process before or after the ramp is embossed.

LIST OF REFERENCE SIGNS

1 Ramp actuator
2 Ramp disc/ramp ring
3 Toothed segment
4 Ramp
5 First end face of the ramp disc
6 Raceway
7 Bearing rolling body
8 Rolling bearing
9 Bearing ring
10 Bearing inner ring
11 Cage
12 Flange
13 Sleeve
14 Recess
15 Oil guide groove
16 Projection
17 Axial width of the ramp disc
18 Support height of the ramp disc
19 Ramp radius of the ramp disc
20 Shoulder height of the ramp disc
21 Diameter of the spherical bearing rolling body
22 Shoulder height of the bearing ring
23 Wall thickness of the bearing ring at the apex of the bearing rolling body
24 Wall thickness of the ramp disc at the apex of the bearing rolling body
25 Rear side
26 Second end face of the ramp disc
27 Bearing ring raceway
28 Contact line
29 Round blank
30 Cup

The invention claimed is:

1. A ramp actuator for a motor vehicle transmission or a motor vehicle clutch, comprising:
a pivotable ramp disc comprising:
a first end face comprising a ramp prepared for the rolling of a ramp rolling body, and
a raceway for bearing rolling bodies of a rolling bearing prepared to receive radial and axial forces, the raceway being axially spaced apart from the first end face such that the ramp rolling body and the bearing rolling bodies do not radially overlap, and
a bearing ring which can be fixed on a shaft, wherein:
a ratio of an axial width to a support height of the ramp disc is between 2.9 and 4.1 and a ratio of a ramp radius of the ramp of the ramp disc to the support height of the ramp disc is between 0.7 and 1.3.

2. The ramp actuator according to claim 1, wherein:
a ratio of a diameter of the bearing rolling body, designed as a ball, to the shoulder height of the bearing ring is ≥3:2, and
a wall thickness of the bearing ring at the apex of the bearing rolling body to the shoulder height of the bearing ring is between 0.2 and 0.6.

3. The ramp actuator according to claim 1, wherein the ramp disc is designed as a sheet metal part produced without producing shavings.

4. The ramp actuator according to claim 1, wherein the rolling bearing is an angular contact ball bearing.

5. The ramp actuator according to claim 1, wherein:
there are three ramps which are separated in a segment-like manner over the circumference of the end face of the ramp disc, and
the three ramps each have a concave contour.

6. The ramp actuator according to claim 1, wherein:
the end face of the ramp disc is provided by a flange,
the flange has a plurality of features evenly distributed over the circumference, and
each feature in the plurality of features is a radially protruding projection or an end-face groove.

* * * * *